Patented Oct. 31, 1950

2,527,522

UNITED STATES PATENT OFFICE 2,527,522

CATALYTIC POLYMERIZATION OF HYDROCARBONS

George R. Bond, Jr., Paulsboro, N. J., and George Alexander Mills, Swarthmore, Pa., assignors to Houdry Process Corporation, Wilmington, Del., a corporation of Delaware No Drawing. Application October 15, 1947, Serial No. 780,108

3 Claims. (Cl. 260—683.15)

In our copending application Serial No. 651,426, Patent No. 2,449,050, filed March 1, 1946, of which the present application is a continuation-in-part, certain novel hydrocarbon conversion processes are described in which cerium phosphate is employed as catalyst. The present application is directed particularly to the use of cerium phosphate catalysts for polymerization of hydrocarbon fractions containing low molecular weight olefins, particularly $C_3$—$C_5$ olefins, to produce chiefly polymeric hydrocarbons containing about 6 to 12 carbon atoms.

In accordance with the invention, a hydrocarbon fraction containing such low molecular weight olefins, more particularly one containing butenes and propenes, is contacted with cerium phosphate under conditions to effect polymerization of these chiefly to $C_6$—$C_8$ polymers. These conditions generally involve temperatures in the range of about 250 to 500° F., preferably from about 300 to 450° F. and superatmospheric pressures to maintain the charge in liquid state or at least in a dense gaseous state approaching the density of the liquid state. Pressures up to 2000 pounds per square inch can be employed, but from the standpoint of equipment particularly, it is preferred to operate at somewhat lower pressure as in the range of 500 to 1200 pounds per square inch.

As readily available charge stocks which are polymerizable by the process of the present invention there may be employed low molecular weight olefinic hydrocarbons or normally liquid or gaseous mixtures containing these and saturated hydrocarbons, such as light ends from the cracking of petroleum hydrocarbons, products from gas-making processes and by-product gasses from butadiene dehydrogenation. For the production of polymer gasoline of high quality useful for blending with straight run gasoline to increase its anti-knock value, it is preferred to employ charge stocks containing at least 20% by volume of propenes and/or butenes. Steam may be added to the charge, if desired.

The polymerization reaction in the presence of cerium phosphate catalyst can be carried out at high space rates in the order of 10 to 20 or more volumes of charge (as liquid) per volume of catalyst per hour, and may be continued over long periods, in excess of 24 hours, without requiring rejuvenation of the catalyst as by steam hydration or otherwise to maintain its activity. Cerium phosphate is stable to regeneration at high temperatures, and any carbonaceous deposit formed during polymerization can be readily removed by burning the same periodically as required, with oxygen-containing gas. Regeneration temperatures of 750°–1100° F. can be safely employed without adverse effect on the catalyst, and requires only a short time, of about an hour or less, after which the catalyst can again be directly used for further polymerization of olefins.

The cerium phosphate catalysts employed in accordance with the present invention are in general produced by the interaction in aqueous menstruum of a compound of cerium and a phosphate, including in the latter term hydrogen phosphates, commonly known as phosphoric acids. Advantageously the cerium compound employed is a fairly soluble cerous salt such as the acetate, chloride or sulfate. Alternatively, an insoluble compound such as the tri- or tetravalent oxide or hydroxide may be employed in dispersed form for reaction with the phosphate. Likewise, soluble phosphates are preferred such as alkali metal or ammonium phosphate as such, or the same may be formed in the reaction mixture employing for instance ortho or meta phosphoric acid and an alkaline reacting salt or base. The cerium phosphate formed, depending upon the specific reactants employed and the concentrations, may be a precipitate or a gel.

The cerium phosphate may be washed free or susbtantially free of other cations and anions if desired and is preferably dried prior to washing. In accordance with a preferred form of the invention, the cerium phosphate is formed into pellets or other discrete pieces in any known or desired manner and the obtained pieces calcined at elevated temperature at above 500° F. For instance the washed or unwashed product may be filtered and partially dried to form a cake which can be broken up to lumps of suitable size or the same may be cast or extruded to pieces of desired size and shape with adjustment of the water content to proper advantage for the particular forming process employed; that is the wet product may be reduced in water content or water added to the dried product as required.

Although the contact material is referred to herein as cerium phosphate for convenience, it cannot be definitely asserted that the mass comprises a combination of cation and anion or comprises a plurality of oxides. Apparently even though precipitating reactions to form the product involve stoichiometric ratios, such ratios may not be retained on calcination, in fact there are some indications that dissociation does occur at least in part at these high temperatures. The invention accordingly is not limited to any particular salt structure or composition but includes the products of interaction of the stated types of reagents, yielding products consisting essentially of combinations of cerium, phosphorus and oxygen, which are herein referred to for expedience as cerium phosphate.

Although the cerium phosphate requires no support and can be used as catalyst in granule or lump form or more regular shaped masses, it is within the scope of the present invention to employ contact masses in which the cerium phosphate is deposited or precipitated in or on a suitable support or carrier, which may be comparatively inactive such as kieselguhr, fuller's earth or bauxite, or an earth or clay having more or less catalytic activity such as a kaolin or an acid-activated bentonite, or a synthetic gel such as silica or silica-alumina.

The cerium compound employed in the reactions above designated need not be a pure compound, so long as metals or compounds deleterious to catalytic polymerization, are kept at a minimum. Naturally occurring rare earth minerals rich in cerium offer a convenient source for the cerium product to be combined with the phosphate. The natural cerium-containing earth may be extracted with an acid such as sulfuric, or rare earth oxides and related metal oxides in admixture from a natural earth may be dissolved in other solubilizing acids such as acetic. The acid liquor containing cerium and other rare earth and closely allied salts may then be precipitated with an alkaline phosphate. Undesired metal compounds may be conveniently removed from the acid liquor previous to phosphate formation by selective or fractional precipitation with suitable reagents.

Monazite, which contains cerium compounds as the principal rare earth metal compound present, with lesser portions of thorium compounds and other rare earth compounds, has been found an excellent starting material for the preparation of cerium-phosphate containing catalysts. The monazite may be extracted with mineral acid and the mixed cerium and other rare earth salts and thorium salts so formed may be precipitated as phosphates in mass or deposited on a suitable carrier. Alternatively, of course, one or more of the metal salts present in the acid liquor may be selectively removed; for instance, thorium can be removed by hot precipitation with $Na_2S_2O_3$. Since monazite contains the rare earth metal compounds in natural state chiefly as phosphates, the invention also includes the use of the natural earth per se in hydrocarbon conversion processes of the types herein designated, as well as contact masses in which the monazite is admixed with or deposited on a suitable matrix or carrier such as silica gel or clay.

Various specific embodiments for preparation of cerium phosphate catalyst are illustrated in the following examples.

Example I

Two solutions were prepared, one by dissolving 115 parts of cerium nitrate in 1680 parts of water. The second solution was prepared by dissolving 91.5 parts of mono-ammonium phosphate ($NH_4H_2PO_4$) in 1680 parts of water and 63 parts of 28% aqua ammonia added thereto. The second solution was poured into the first and about 9 parts of phosphoric acid ($H_3PO_4$) added with agitation. A gel was formed at 7.2 pH. (Above proportions are given by weight).

The gel above formed was allowed to stand for one hour, then filtered and dried at 250° F. with circulation of air through the gel. The dried gel, which was a hard, dark brown, granular product, was water washed until free of $NO_3$ and Ce; at this stage only traces of $PO_4$ were tested in the wash water. The washed gel was pan dried at 250° F. and formed into 6 mm. pellets, which were calcined in air at 1050° F. for 2 hours.

The calcined catalyst is fairly hard and thermally stable, and therefore can be employed over long periods without excessive losses due to attrition and volatilization.

A phosphate catalyst may be similarly prepared by employing a mixture of soluble rare earth salts such as acetates predominating in cerium acetate instead of the cerium nitrate.

Example II

Monazite sand was digested with concentrated sulfuric acid with stirring over a period of three hours at a temperature just below boiling, then cooled and poured into water. The residue was further extracted with water until no more dissolved.

Sodium silicate diluted with water was added to the above solution in calculated proportions to obtain 90% $SiO_2$ by weight to 10% of the dried phosphate weight and aqueous ammonia added to pH 8. The mass set to a firm gel in about five seconds, which was permitted to stand for an hour.

The gel was granulated and dried at 180°–200° F., then washed with water and ammonium chloride solution a number of times to remove sodium ions and again dried.

The dried product was ground and made into a smooth paste which was cast into 4 mm. pellets. The pellets were dried at 105° C. and calcined for five hours at 1400° F. in air containing 6.5% by weight of steam.

As an example of depositing a natural phosphate on a carrier, monazite sand as a fine powder may be batched with about four times its weight of kaolin or other clay and water added to make a thick paste. A small amount of kerosene or gas oil mixed into the paste will assist extrusion of the paste into rods which can be broken up into catalyst pellets.

Example III

The catalyst of Example I was employed in the polymerization of an olefin containing charge of the following composition:

| Component | mol per cent | Wt. per cent |
|---|---|---|
| Propane | 2.0 | 1.5 |
| iso-butane | 54.0 | 54.3 |
| n-butane | 19.3 | 19.4 |
| isobutene | 7.6 | 7.4 |
| butene-1 | 4.9 | 4.8 |
| butene-2 | 9.6 | 9.3 |
| isopentane | 2.3 | 2.9 |
| pentenes | 0.3 | 0.4 |

The charge was introduced into a reactor containing a fixed bed of the catalyst at a space rate of 10 volumes (liquid at 60° F.) of charge per volume of catalyst per hour, and polymerized under pressure of 600 pounds per square inch gage, during a period of four hours at each of the temperatures indicated in the following table. The yields are shown in the table.

| | | | |
|---|---|---|---|
| Avg. bed temp., °F | 325 | 400 | 305 |
| Conv. mol per cent: | | | |
| Total unsats | 55.2 | 39.4 | 48.8 |
| Iso-butylene | 88.8 | 61.0 | 81.9 |
| n-butylene | 3.8 | 20.7 | 19.7 |
| Product insp.: | | | |
| Gravity, °API | 71.5 | 71.9 | 65.1 |
| ASTM dist.— | | | |
| Int., vol. per cent | 86 | 87 | 89 |
| 5 | 90 | 95 | 131 |
| 10 | 97 | 103 | 170 |
| 20 | 113 | 120 | 220 |
| 30 | 140 | 145 | 231 |
| 40 | 192 | 187 | 239 |
| 50 | 229 | 218 | 249 |
| 60 | 248 | 227 | 266 |
| 70 | 279 | 238 | 314 |
| 80 | 351 | 260 | 350 |
| 90 | 432 | 350 | --- |
| 95 | --- | --- | --- |
| E. P. | 487 | 413 | 433 |

Obviously many modifications and variations of the invention as hereinbefore set forth may be made without departing from the spirit and scope thereof and therefore only such limitations should be imposed as are indicated in the appended claims.

We claim as our invention:

1. The method of selectively polymerizing isobutylene to polymers thereof boiling essentially in the range of gasoline, which comprises subjecting a low molecular weight hydrocarbon charge comprising isobutylene to contact with an adsorptive contact mass containing cerium phosphate as the sole component thereof having catalytic polymerizing activity, at a temperature of 250–500° F. and under pressure at least sufficient to maintain the hydrocarbon charge in liquid state.

2. The process in accordance with claim 1 in which the temperature is maintained within the range of 300–450° F. and the pressure within 500–1200 pounds per square inch gauge.

3. The process in accordance with claim 1 in which said adsorptive contact mass consists essentially of cerium phosphate.

GEORGE R. BOND, Jr.
GEORGE ALEXANDER MILLS.

REFERENCES CITED

The following references are of record in the file of this patent:

UNITED STATES PATENTS

| Number | Name | Date |
|---|---|---|
| 1,813,478 | Andrussov et al. | July 7, 1931 |
| 2,336,793 | Layng et al. | Dec. 14, 1943 |

FOREIGN PATENTS

| Number | Country | Date |
|---|---|---|
| 316,945 | Great Britain | Aug. 14, 1930 |

OTHER REFERENCES

Berkman et al., Catalysis, page 961, Reinhold Publ. Corp. (1940).